United States Patent [19]

Bemis

[11] Patent Number: 5,487,160
[45] Date of Patent: Jan. 23, 1996

[54] CONCURRENT IMAGE BACKUP FOR DISK STORAGE SYSTEM

[75] Inventor: Edward D. Bemis, Derby, Kans.

[73] Assignees: AT&T Global Information Solutions Company, Dayton, Ohio; Hyundai Electronics America, Milpitas, Calif.; Symbios Logic Inc., Fort Collins, Colo.

[21] Appl. No.: 985,710

[22] Filed: Dec. 4, 1992

[51] Int. Cl.$^6$ .................................................. G06F 12/00
[52] U.S. Cl. .......................... 395/441; 395/477; 395/489; 364/268; 364/285.1; 364/DIG. 1
[58] Field of Search .................................... 395/425, 441, 395/477, 489; 364/200 MS File, 900 MS File, 268, 285.1

[56] References Cited

U.S. PATENT DOCUMENTS

| | | | |
|---|---|---|---|
| 4,403,288 | 9/1983 | Christian et al. | 395/275 |
| 4,899,342 | 2/1990 | Potter et al. | 371/10.1 |
| 4,914,656 | 4/1990 | Dunphy, Jr. et al. | 371/10.2 |
| 5,175,849 | 12/1992 | Schneider | 395/600 |
| 5,210,866 | 5/1993 | Milligan et al. | 395/575 |
| 5,212,784 | 5/1993 | Sparks | 395/575 |
| 5,239,646 | 8/1993 | Kimura | 395/575 |
| 5,258,984 | 11/1993 | Menon et al. | 371/10.2 |
| 5,276,860 | 1/1994 | Fortier et al. | 395/575 |
| 5,297,258 | 3/1994 | Hale et al. | 395/275 |
| 5,313,612 | 5/1994 | Satoh et al. | 395/425 |
| 5,321,826 | 6/1994 | Ushiro | 395/425 |
| 5,345,565 | 9/1994 | Jibbe et al. | 395/325 |
| 5,402,428 | 3/1995 | Kakuta et al. | 371/10.1 |

Primary Examiner—Tod R. Swann
Assistant Examiner—Frank J. Asta
Attorney, Agent, or Firm—Wayne P. Bailey; James M. Stover

[57] ABSTRACT

A disk drive within a disk array is utilized to capture the original image of data blocks that are updated, i.e., written over, through normal array processes during backup operations. The method captures original data images in a manner that allows the array to be restored to the state that existed at the initiation of the backup process. During execution of backup procedures data is moved in logical block sequence (0 to N) from the array to a backup device, such as a magnetic tape backup device, continuing until all array data has been transferred. Should a write request be received by the disk array controller during backup, the block address associated with the write request is checked to determine if the original data at that address has been written to the backup device. If the original data residing at the target block address has been written to the backup device the write request is scheduled for execution by the array controller. However, if the original data residing at the target block address has not yet been written to the backup device, the original images of the data blocks are copied to the spare drive prior to scheduled execution of the write request. Upon completion of the backup process, the original data images copied to the spare drive are also transferred to the backup device. Thus, all information necessary to restore the array to the state that existed at the time of initiation of the backup process is saved to the backup device. Although there are other sequences in which data could be moved to the backup device, the particular sequence described herein has the least impact (lowest overhead) on normal array activity during the backup process.

9 Claims, 12 Drawing Sheets

RAID 3

CONCURRENT IMAGE BACKUP FOR DISK STORAGE SYSTEM

The present invention relates to disk storage systems and, more particularly, to backup support features for disk array storage systems.

BACKGROUND OF THE INVENTION

RAID (Redundant Array of Inexpensive Disks) storage systems have emerged as an alternative to large, expensive disk drives for use within present and future computer system architectures. A RAID storage system includes an array of hard disk drives, such as the 5¼ or 3½ inch disk drives currently used in personal computers and workstations. Although disk array products have been available for several years, significant improvements in the reliability and performance of small disk drives and a decline in the cost of such drives have resulted in the recent enhanced interest in RAID systems.

Current disk array design alternatives are described in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks. Five disk array arrangements, referred to as RAID levels, are described. The simplest array, a RAID level 1 system, comprises one or more disks for storing data and an equal number of additional "mirror" disks for storing copies of the information written to the data disks. The remaining RAID levels, identified as RAID level 2, 3, 4, 5 and 0 systems, segment the data into portions for storage across several data disks. One or more additional disks are utilized to store error check or parity information. The present invention is primarily directed to improvements in the operation of RAID level 3, 4, 5 and 0 systems.

A RAID level 3 disk array comprises N+1 disks wherein N disks are used to store data, and the additional disk is utilized to store parity information. During RAID level 3 write functions, each block of data is divided into N portions and striped across the N data disks. The corresponding parity information, calculated by performing a bit-wise exclusive-OR of corresponding portions of the data striped across the N data drives, is written to the dedicated parity disk. Write operations therefore involve all N+1 drives within the array. When data is read, only the N data disks must be accessed. The parity disk is used to reconstruct information in the event of a disk failure.

A RAID level 3 system including five drives is shown in FIG. 1. The disk drives are labeled DRIVE A through DRIVE E. Data is striped across disks DRIVE A through DRIVE D, each data disk receiving a portion of the data being saved. Data striping may occur at either the byte or word level. Parity information, generated through a bit-wise exclusive-OR of the data stored on drives DRIVE A through DRIVE D, is saved on drive DRIVE E. Also shown is a sixth, spare disk drive, labeled DRIVE F, which is included in the array as a replacement for any of disks DRIVE A through DRIVE D should one fail. An array controller 100 coordinates the transfer of data between the host system 147 and the array disk drives. The controller also calculates and checks parity information. Blocks 145A through 145E illustrate the manner in which data bytes and parity information are stored on the five array drives. Data bytes are identified with hexadecimal numerals 00 through 0F. Parity bytes are identified as PARITY 0 through PARITY 3.

A RAID level 4 disk array is also comprised of N+1 disks wherein N disks are used to store data, and the additional disk is utilized to store parity information. However, data to be saved is divided into larger portions, consisting of one or more blocks of data, for storage among the disks. Writes typically require access to two disks, i.e., one of the N data disks and the parity disk. Read operations typically need only access a single one of the N data disks, unless the data to be read exceeds the block length stored on each disk. As with RAID level 3 systems, the parity disk is used to reconstruct information in the event of a disk failure.

RAID level 5 disk arrays are similar to RAID level 4 systems except that parity information, in addition to the data, is distributed across the N+1 disks in each group. Each one of the N+1 disks within the array includes some blocks for storing data and some blocks for storing parity information. Where parity information is stored is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations.

A RAID level 5 system including five data and parity disk drives, DRIVE A through DRIVE E, and a spare disk drive, DRIVE F, is illustrated in FIG. 2. Array controller 100 coordinates the transfer of data between the host system 147 and the array disk drives. The controller also calculates and checks parity information. Blocks 145A through 145E illustrate the manner in which data and parity is stored on the five array drives. Data blocks are identified as BLOCK 0 through BLOCK 15. Parity blocks are identified as PARITY 0 through PARITY 3.

A RAID level 0 disk array includes N data disks for storing data. Data is striped across the N data disks. The array controller accesses each drive independently, allowing up to N concurrent read or write operations at N different physical locations. This provides transparent load balancing and thus a performance improvement over a single disk drive. There is no parity generation or storage provided with RAID level 0, so there are no data recovery or reconstruction features as are provided with RAID levels 1, 3 and 5.

RAID level 0 provides data striping by system block size, high capacity, high transaction performance and no write penalty, but does not provide data recovery or extended data availability. This RAID level is best utilized for applications which require additional performance, but not the data availability provided by the other RAID levels.

The RAID alternatives discussed above provide improvements in performance, reliability, power consumption, scalability and capacity in comparison to single large magnetic disks. However, coincident with these improvements there exists a need to backup ever increasing amounts of data while maintaining on-line availability of the data being transferred to a backup device. Because the data must remain available to many applications, it is desirable that backup operations be executed concurrently with normal disk array operations and transparent to most users of the system.

OBJECTS OF THE INVENTION

It is therefore an object of the present invention to provide a new and useful method for providing computer system disk storage backup concurrent with normal, on-line, operation of the disk storage device.

It is another object of the present invention to provide a method for backing up a disk array concurrent with normal disk array function.

It is a further object of the present invention to provide such a method wherein a spare drive within a the disk array is utilized to support backup operations.

It is yet another object of the present invention to provide a new and useful method for utilizing a spare disk drive within a disk array to stage and sequence data for a backup device.

It is still a further object of the present invention to provide such a method for execution concurrent with normal disk array operation which saves the original image of data blocks to the spare drive prior to their being written over if they have not yet been transferred to the backup device.

SUMMARY OF THE INVENTION

There is provided, in accordance with the present invention, a method for concurrently backing up the contents of a disk storage system to a backup storage device and processing write I/O requests received by the disk storage system. The method includes the steps of sequentially copying data from the disk storage system to the backup storage device; halting the process of sequentially copying data from the disk storage system to the backup storage device upon receipt of a write I/O request; determining whether the received write I/O request updates data residing in a storage area within the disk storage system which has not been copied to the backup device; copying the data residing in the storage area to a temporary storage device if the data residing in the storage area has not been copied to the backup device; and executing the received write I/O request to update the data residing in the storage area. The process of sequentially copying data from the disk storage system to the backup storage device is resumed upon satisfaction of the write I/O request. Upon completion of the backup process, i.e., the process of sequentially copying data from the disk storage system to said backup storage device, the contents of the temporary storage device are copied to the backup storage device.

In the described embodiment, the disk storage system comprises a disk array incuding a plurality of active disk drives and at least one spare drive which function as the temporay storage device. Upon receipt of a write I/O request directed to an area within the disk array which has been backed up to the backup storage device, the backup process is stayed and the write request processed. Upon reciept of a write I/O request directed to an area within the disk array which has not been backed up to the backup storage device, the backup process is halted, the data contents of the area which have not been backed up are copied to the spare drive, and the write I/O request processed.

The above and other objects, features, and advantages of the present invention will become apparent from the following description and the attached drawings.

DETAILED DESCRIPTION OF THE PREFERRED EMBODIMENT

Array Controller Architecture

Figure 3A:
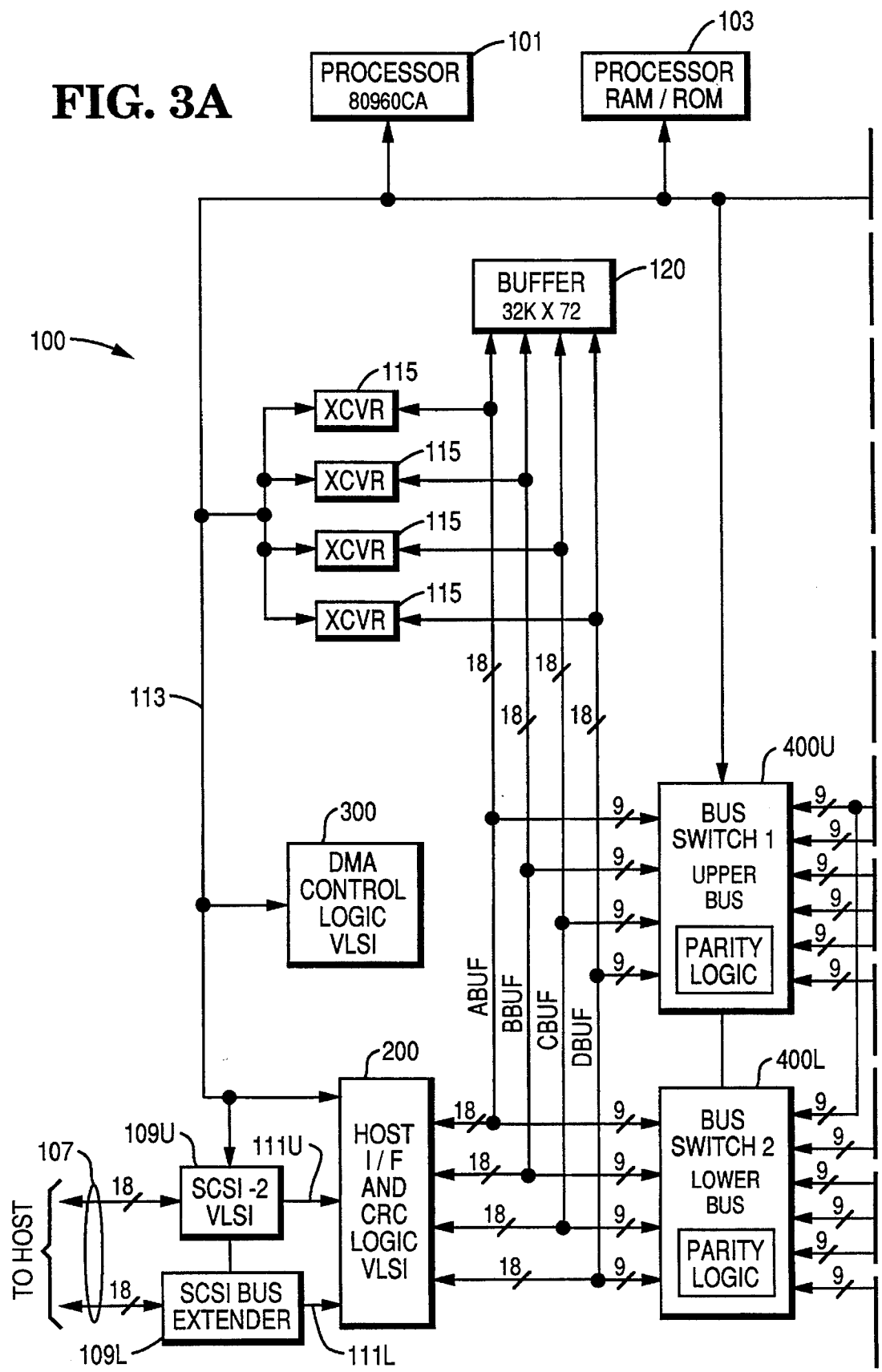
FIGS. 3A and 3B illustrate in block diagram form one possible architecture for disk array controller 100 shown in FIGS. 1 and 2.
Figure 3B:
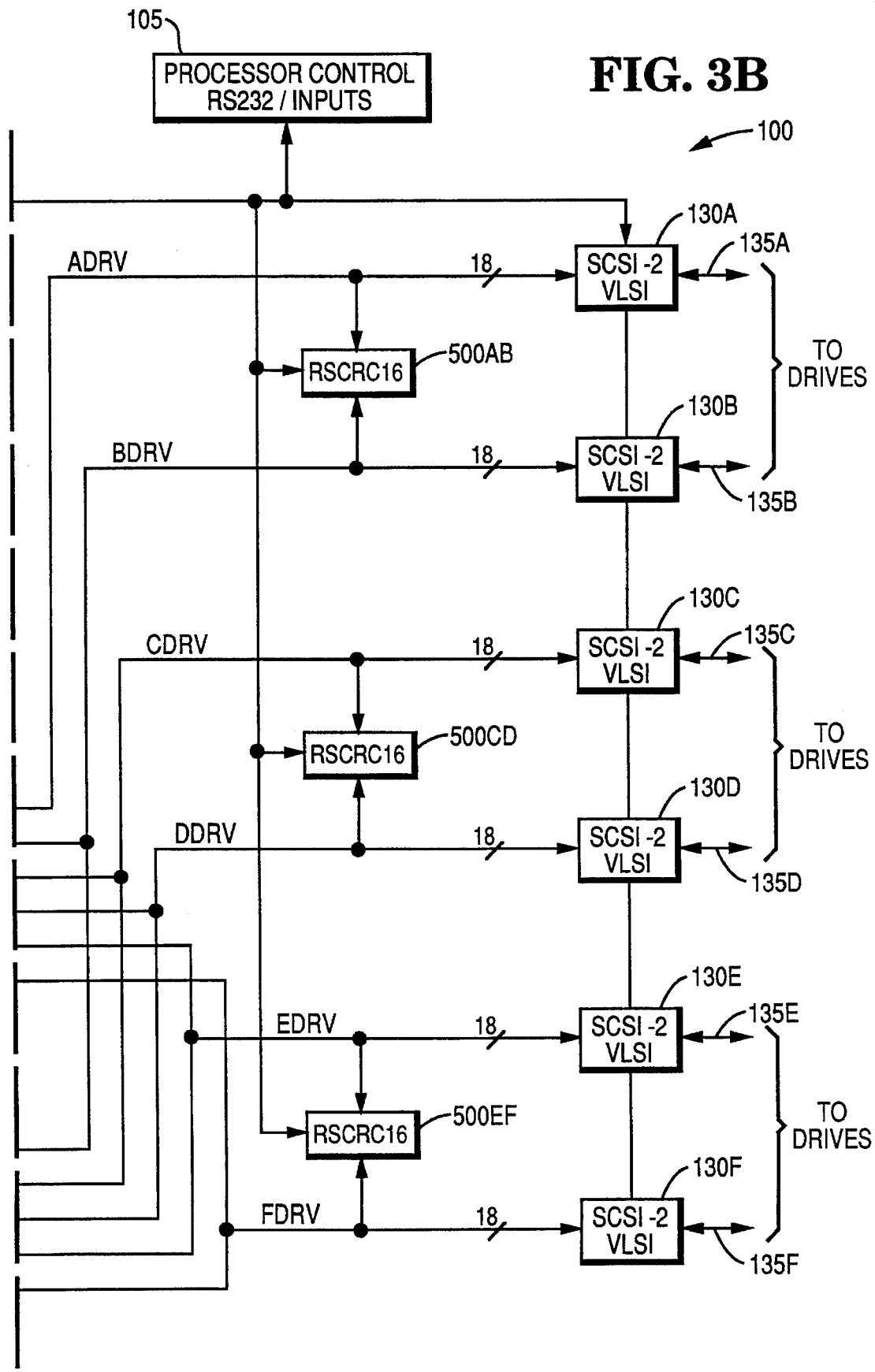

Referring now to FIGS. 3A and 3B, the architecture of a disk array controller 100 for a RAID system is shown in block diagram form. The array controller coordinates the operation of the multitude of disk drives within the array to perform read and write functions, parity generation and checking, and data restoration and reconstruction. The controller exchanges data with the host computer system (not shown) through Host Interface and CRC Logic block 200. Host I/F Logic block 200, under the control of processor 101, interfaces an external 18-bit or 36-bit wide, SCSI-2 bus 107 associated with the host system with four internal 18-bit wide buffer busses ABUF, BBUF, CBUF and DBUF, providing multiplexing functionality between bus 107 and the buffer busses. Bus 107 connects to Host I/F Logic block 200 through a standard SCSI-2 chip set, represented by blocks 109U and 109L and eighteen-bit busses 111U and 111L. Interconnection between block 200 and processor 101 is provided by address/data bus 113. The internal construction and operation of block 200 will be described in greater detail below with reference to FIGS. 4A and 4B.

Internal buffer busses ABUF, BBUF, CBUF and DBUF connect Host I/F Logic block 200 with a RAM buffer 120 and upper and lower byte bus switches 400U and 400L. Buffer 120 possesses the capability to read and write 72-bit wide words from the four buffer busses, or individual 18-bit wide words from any one of the buffer busses. Eighteen or 36-bit access is also provided through transceivers 115 to bus 113.

Bus switches 400U and 400L provides variable bus mapping between buffer busses ABUF, BBUF, CBUF and DBUF and six 18-bit wide drive busses labeled ADRV, BDRV, CDRV, DDRV, EDRV and FDRV, each switch providing routing for one byte (eight bits data and one bit parity) of information. Bus switches 400U and 400L further include the capability to generate parity information, which may be directed onto any of the buffer or drive busses, check parity information and reconstruct information stored on a failed disk drive. FIG. 4, discussed below, provide greater detail concerning the construction and operation of bus switches 400U and 400L.

Each one of drive busses ADRV, BDRV, CDRV, DDRV, EDRV and FDRV is connected to an associated SCSI-2 device, labeled 130A through 130F, which provide connection to six corresponding disk drives (not shown) forming the disk array. The six drives will be identified herein as drives A through F. Reed-Solomon Cyclic Redundancy Check (RSCRC) logic blocks 500AB, 500CD and 500EF are connected between busses ADRV and BDRV, CDRV and DDRV, and EDRV and FDRV, respectively, to provide error detection and generation of Reed-Solomon CRC for the array controller.

The control of Host I/F Logic block 200; bus switches 400U and 400L; RSCRC logic blocks 500AB, 500CD and 500EF; and SCSI devices 109U, 109L, and 130A through 130F is provided by microprocessor 101. Communication between microprocessor 101, associated processor memory 103 and processor control inputs 105 and the above-identified elements is provided by address/data bus 113. Also shown connected to bus 113 is DMA Control Logic block 300. The logic within block 300 provides DMA control for Host I/F Logic block 200, bus switches 400U and 400L, SCSI-2 devices 130A through 130F and processor 101.

Host I/F Logic Architecture

Figure 1:
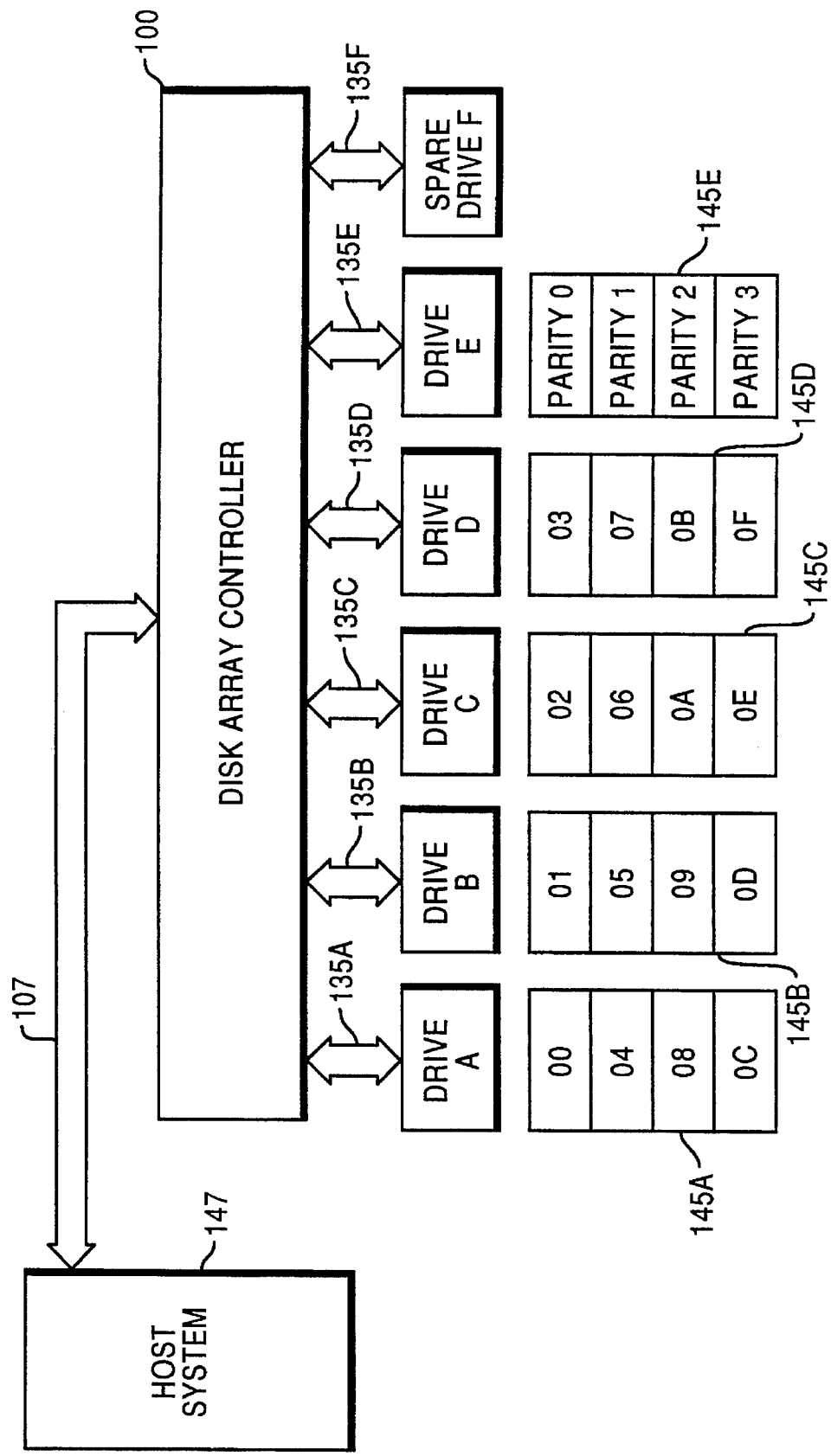
FIG. 1 is a block diagram representation of a RAID level 3 array including four data disk drives and one parity disk drive.
Figure 4A:
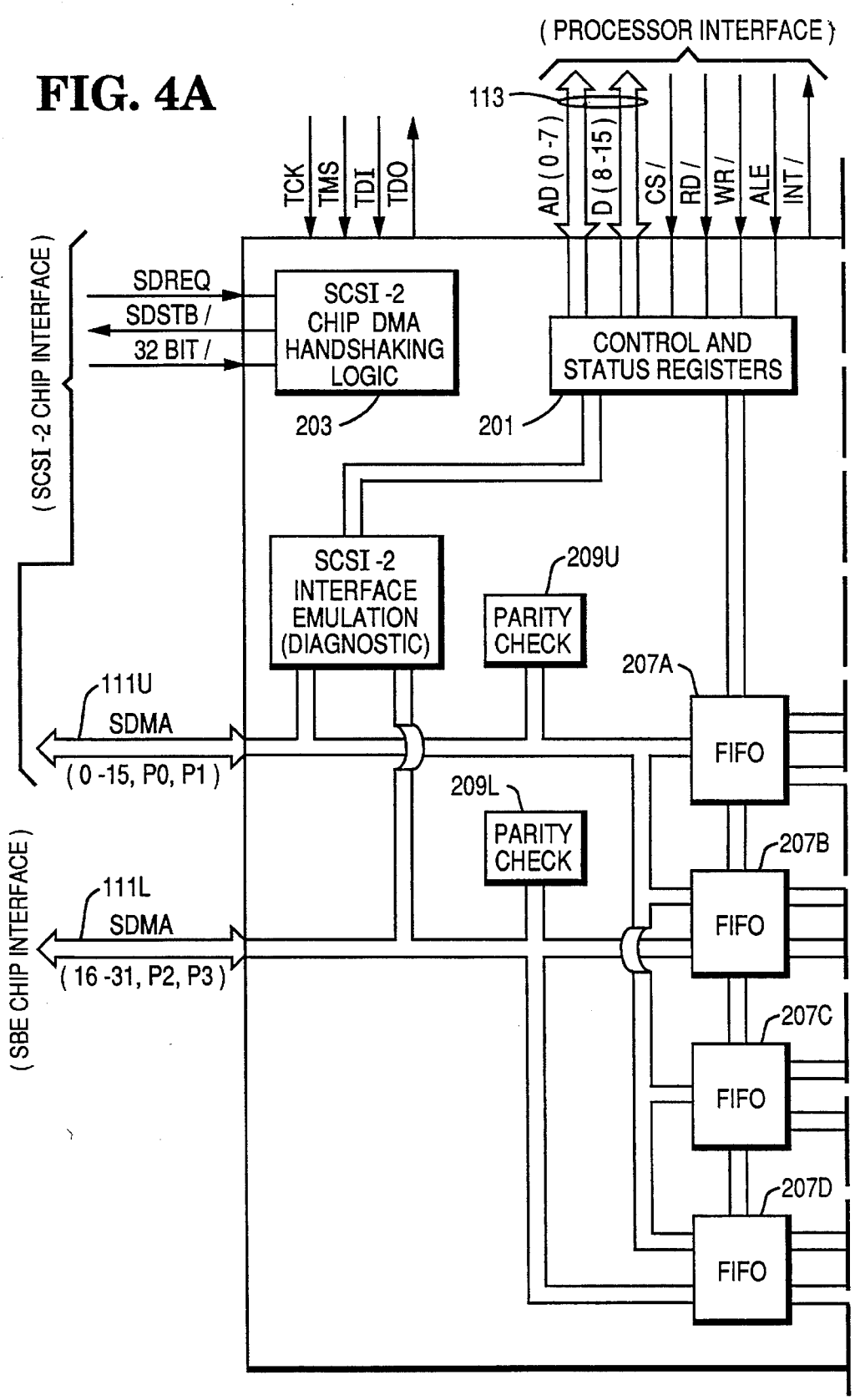
FIGS. 4A and 4B together provide a block diagram illustration of the logic included within Host I/F Logic block 200 shown in FIG. 1.
Figure 4B:
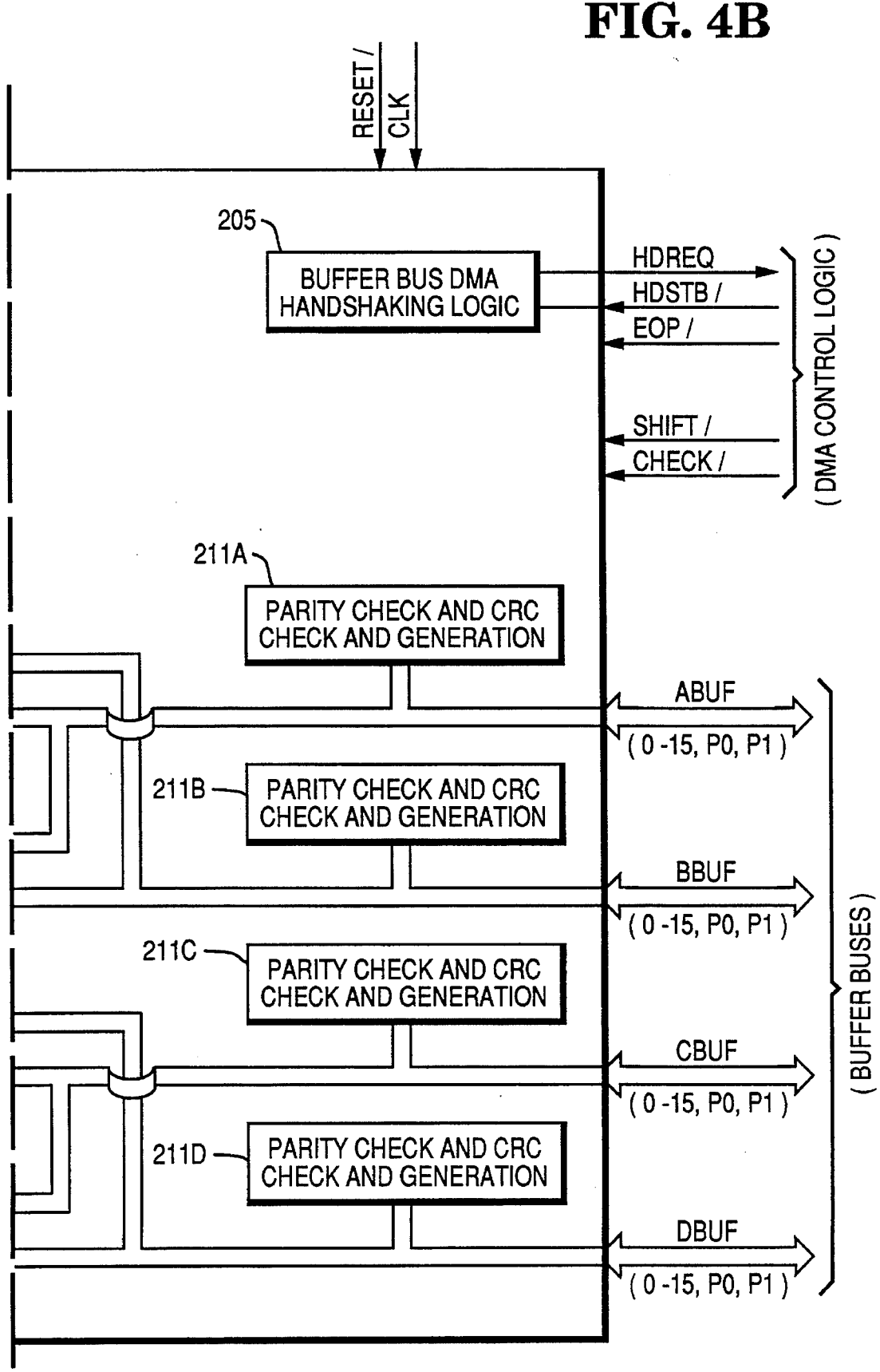

FIGS. 4A and 4B together provide a block diagram illustration of the logic included within Host I/F Logic block 200 shown in FIG. 1. The Host I/F Logic block includes six major types of internal logic blocks: control and status registers 201, SCSI-2 DMA bus handshaking logic 203, buffer bus DMA handshaking logic 205, FIFO blocks 207A through 207D, parity check blocks 209U and 209L, and parity check and CRC generation blocks 211A through 211D.

Control and status register block 201 contains several 16-bit control registers utilized to configure, control and reset the functions of Host I/F Logic block 200. Block 201 also includes status registers used by controller microprocessor 101 to determine the state of the Host I/F Logic block. Microprocessor access to the control and status registers within block 201 is provided by multiplexed address/data bus AD(0-7), data bus D(8-15), and various control lines for transmitting chip select signal CS/, read signal RD/, write signal WR/, address latch enable signal ALE and interrupt signal INT/. Busses AD(0-7) and D(8-15) are included within address/data bus 113, shown in FIG. 1.

Block 203 contains the SCSI-2 DMA bus handshaking logic necessary to effectuate DMA transfers between Host I/F Logic block 200 and SCSI-2 device 109U. The handshaking logic also controls the multiplexing and demultiplexing of data between SCSI devices 109U and 109L and FIFOs 207A through 207D. Block 203 also modulates request/acknowledge handshaking depending upon the empty or full status of the FIFOs. Buffer bus DMA handshaking logic 205 contains similar handshaking logic for controlling DMA transfers between the Host I/F Logic block and an external buffer bus controller.

The four FIFO blocks 207A through 207D are utilized to eliminate any handshaking dependencies between the Host I/F Logic block and buffer busses ABUF, BBUF, CBUF and DBUF. FIFO blocks 207A and 207B are each connected between bus 111U and buffer busses ABUF and BBUF. FIFO blocks 207C and 207D are each connected between bus 111U and buffer busses CBUF and DBUF. If the controller architecture includes SCSI bus extender device 109L and associated bus 111L, blocks 207B and 207D are also connected to bus 111L. The configuration and operation of the FIFO blocks are controlled by registers within block 201. Each FIFO block can store up to four eighteen bit words (sixteen bits of data and two bits of parity).

Blocks 209U and 209L provide parity check for all information transmitted between the Host I/F Logic block and SCSI-2 devices 109U and 109L, respectively. These blocks generate parity information for the data transfers and compare the generated parity information with the parity information transmitted with the data.

Blocks 211A through 211D provide a parity check for data transfers between the Host I/F Logic block and respective buffer busses. Blocks 211A through 211D also function to generate and append CRC data to DMA data blocks, and to check and remove appended CRC data from DMA data blocks.

In operation Host I/F Logic block 200 is used to multiplex data between SCSI-2 devices 109U and 109L and the four buffer busses ABUF, BBUF, CBUF and DBUF. Block 200 provides multiplexing functionality between busses 111U and 111L and (1) all four buffer busses for 4+1 RAID level 3 and high bandwidth RAID level 5 applications by word stripping data across the four buffer busses in a rotating sequential order, (2) one of two defined pairs of buffer busses for 2+1 RAID level 3 applications by word stripping data across the pair of buffer busses in a rotating sequential order, of (3) any one of the buffer busses for RAID level 1 and single bus RAID level 5 applications.

Additional detail concerning the structure and operation of the Aarray Controller Architecture discussed earlier and shown in FIGS. 3A and 3B and the Host I/F Logic Architecture discussed above and shown in FIGS. 4A and 4B is provided in U.S. patent application No. 07/746,399, filed on Aug. 16, 1991, incorporated herein by reference. U.S. patent application No. 07/746,399, entitled "Disk Array Controller Architecture," is assigned to NCR Corporation.

Bus Switch Architecture

Figure 5:
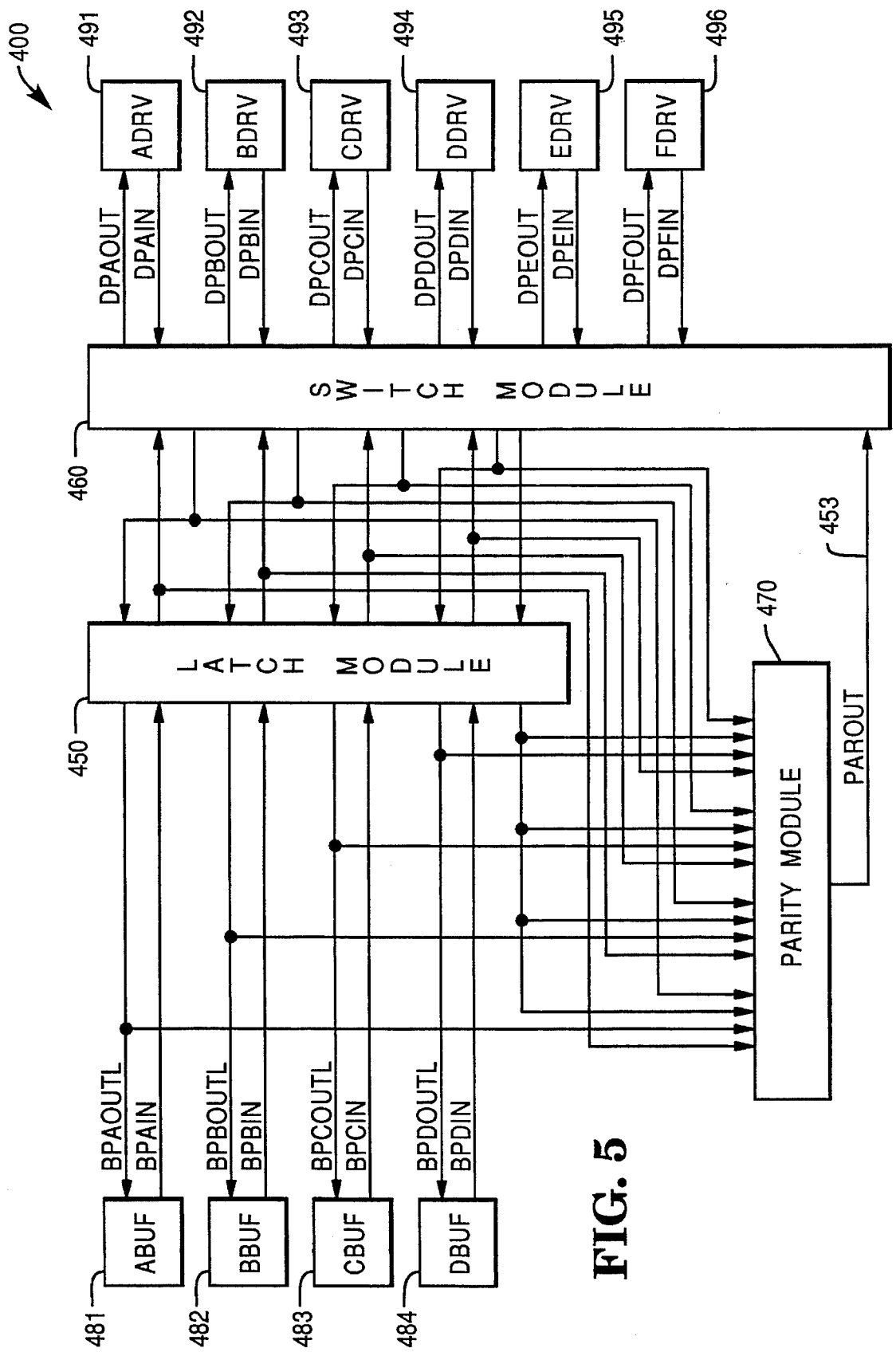
FIG. 5 is a block diagram illustration of the logic included within Bus Switch block 400U shown in FIGS. 3A and 3B.

The logic included within each one of bus switches 400U and 400L is shown in the block diagram of FIG. 5. The structure shown is formed upon a single semiconductor chip. The four host ports, labeled 481 through 484, provide connection to the four controller busses ABUF, BBUF, CBUF and DBUF, respectively. The array ports, identified by reference numerals 491 through 496, connect with the six disk drive busses ADRV, BDRV, CDRV, DDRV, EDRV and FDRV, respectively. Bus switches 400U and 400L operate together to provide a unidirectional connection between any one of controller buses ABUF, BBUF, CBUF and DBUF and any one of drive buses ADRV, BDRV, CDRV, DDRV, EDRV and FDRV. Multiple connections between several controller busses and an equal number of drive busses is also permitted. Additionally, the bus switches may provide unidirectional connection of any controller bus to two or more drive busses. Parity information obtained via bus 453 can also be ported to any one of the drive busses.

The architecture of each bus switch is composed of three primary blocks: a latch module 450, switch module 460, and a parity module 470. Switch module 460 is connected between controller busses ABUF, BBUF, CBUF and DBUF and drive busses ADRV, BDRV, CDRV, DDRV, EDRV and FDRV. An additional bus 453 connects parity module 470 to bus switch module 460. Several functions are provided by bus switch module 460. First, bus switch module 460 provides a unidirectional connection between any controller bus and any drive bus. Multiple connections between several controller busses and an equal number of drive busses is also permitted.

Second, the bus switch module provides connection between any two or more of the drive busses. Such an operation is necessary for the transfer of information between disk drives without interfering with host or controller operations.

Third, bus switch module 460 provides connection between any two or more of the controller busses. This mode of operation supports data reorganization on the controller by allowing data to be propogated from one controller bus to another. This mode of turnaround operation is also advantageous for BIST (Built-In Self Test) development.

Finally, the bus switch module provides unidirectional connection of any controller bus to one or more drive busses. Parity information obtained via bus 453 can also be ported to any one of the drive busses.

Parity module 470 includes connections to each of the controller busses for receiving data therefrom and a connection to bus 453 for providing parity information to bus switch module 460. Parity module 470 generates parity information for RAID level 3, 4 and 5 operations by performing a bit-wise exclusive-OR of each active controller bus. The parity information is provided to bus switch module 460 via bus 453.

Additional detail concerning the structure and operation of bus switches 400U and 400L discussed above and shown in FIG. 5 is provided in U.S. patent application No. 07/701, 921, filed on May 17, 1991, incorporated herein by reference. U.S. patent application No. 07/701,921, entitled "Multi-Channel Data And Parity Exchange Device," is assigned to NCR Corporation.

Concurrent Image Backup Operation

The method of the present invention utilizes an array spare drive, or other disk domain, to capture the original image of data blocks that are updated, i.e., written over, by the normal array process during backup operations. The method, as described below, captures original data images in a manner that allows the array to be restored to the state that existed at the initiation of the backup process. In this manner the initiating application can control the time, and thus the state, of the entire array environment being backed up.

During execution of the backup procedures data is moved in logical block sequence (0 to N) from the array to the backup device, such as a magnetic tape, continuing until the entire array has been transferred. Should a write request be received by the array controller during backup, the block address associated with the write request is checked to determine if the original data at that address has been written to the backup device. If the original data residing at the target block address has been written to the backup device the write request is scheduled for execution by the array controller. However, if the original data residing at the target block address has not yet been written to the backup device, the original images of the data blocks are copied to the spare drive, or to a storage buffer, prior to scheduled execution of the write request.

The procedure for capturing original data images prior to overwriting the original data with new data varies for different array configurations. A discussion of the process for managing original data image capture in RAID level 3 and 5 disk array systems follows.

Figure 6:
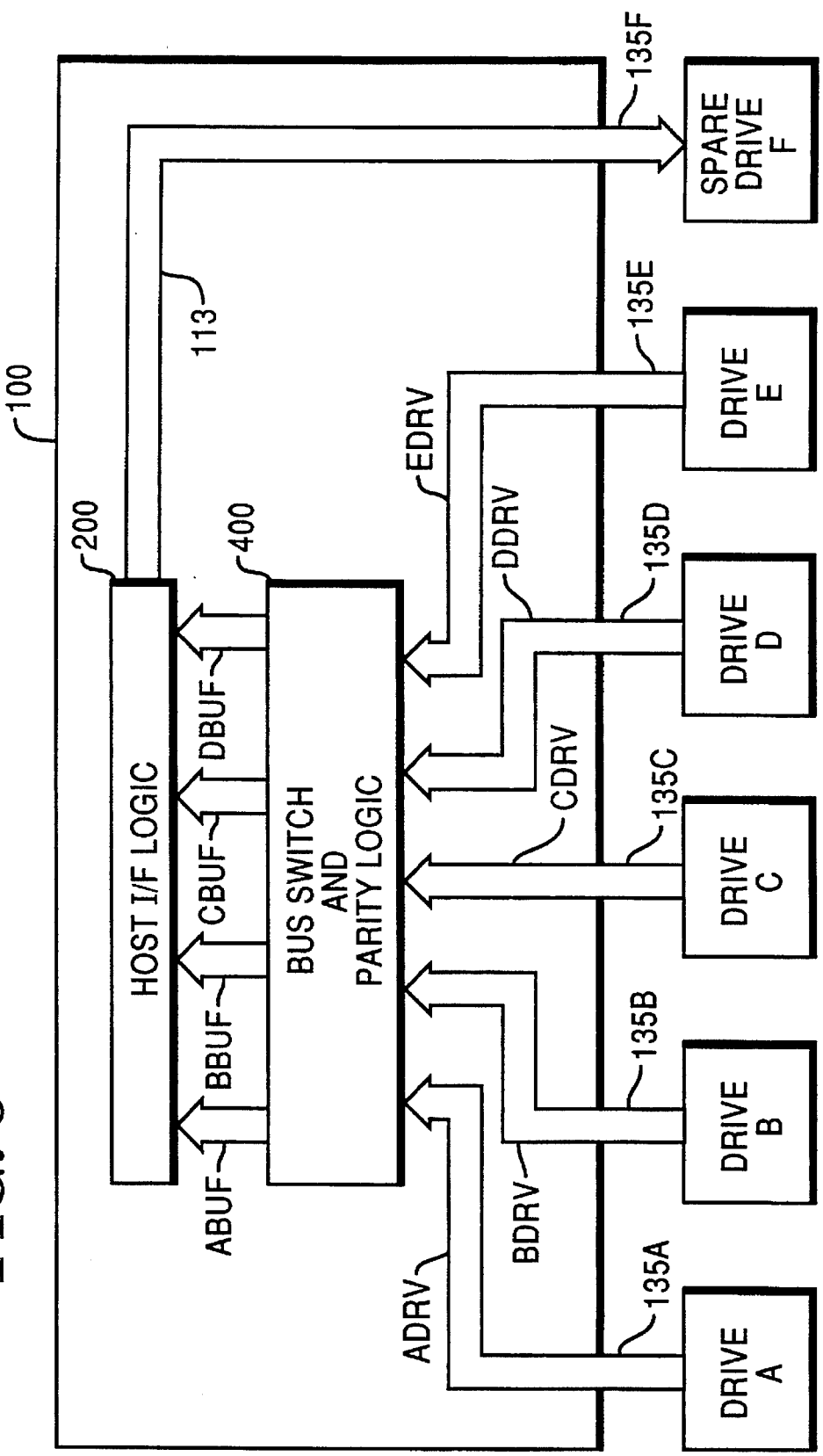
FIGS. 6 and 7 illustrate the use of the spare disk drive within the RAID level 3 disk array shown in FIG. 1 to capture original data images during array backup procedures in accordance with the method of the present invention.
Figure 7:
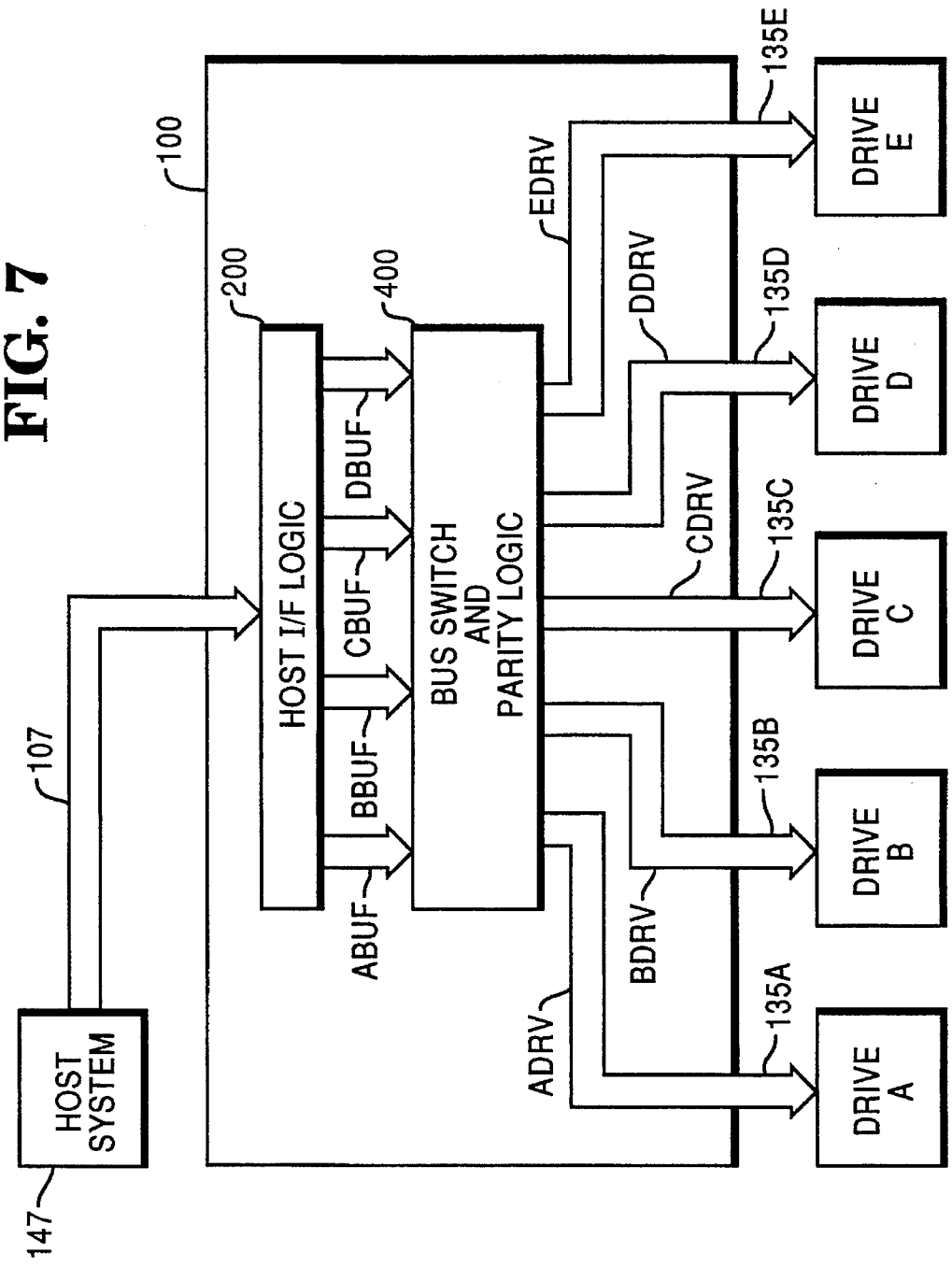

FIGS. 6 and 7 illustrate the use of the spare disk drive within the RAID level 3 disk array shown in FIG. 1 to capture original data images during array backup procedures in accordance with the method of the present invention. Only structure required to facilitate an understanding of the original data image capture and write operations is shown in FIGS. 6 and 7.

An additional read operation is required to capture original data images in a RAID level 3 disk array. FIG. 6 illustrates the first step in the concurrent image backup operation for a RAID level 3 disk array. Under direction of the controller processor 101, not shown, each array data block to be updated is read from the array drives and written to the spare drive DRIVE F. Bus switch and parity logic 400 is configured to route the original data read from corresponding areas within drives DRIVE A through DRIVE B to host I/F logic 200. Within bus switch logic 400, parity is recalculated and compared with parity information read from DRIVE E. Host I/F logic 200 demultiplexes the data received via busses ABUF through DBUF and directs the demultiplexed data to spare drive DRIVE F. Alternatively, the demultiplexed data is written to storage buffer 120 and later transferred to spare drive DRIVE F. By writing the original data images to storage buffer 120 original data images obtained from several array write operations can be collected prior to scheduling a write I/O to DRIVE F, thereby conserving array controller processing time.

Referring now to FIG. 7, the completion of the RAID level 3 disk array write operation is illustrated. Under direction of array controller processor 101, the new data received from host system 107 is directed into host I/F logic 200. The data is multiplexed or striped accross buffer busses ABUF through DBUF by the logic within host I/F logic 200, and routed through bus switch 400 for storage on drives DRIVE A through DRIVE D. Parity information is concurrently generated by the parity logic within bus switch 400 and written to DRIVE E.

Figure 2:
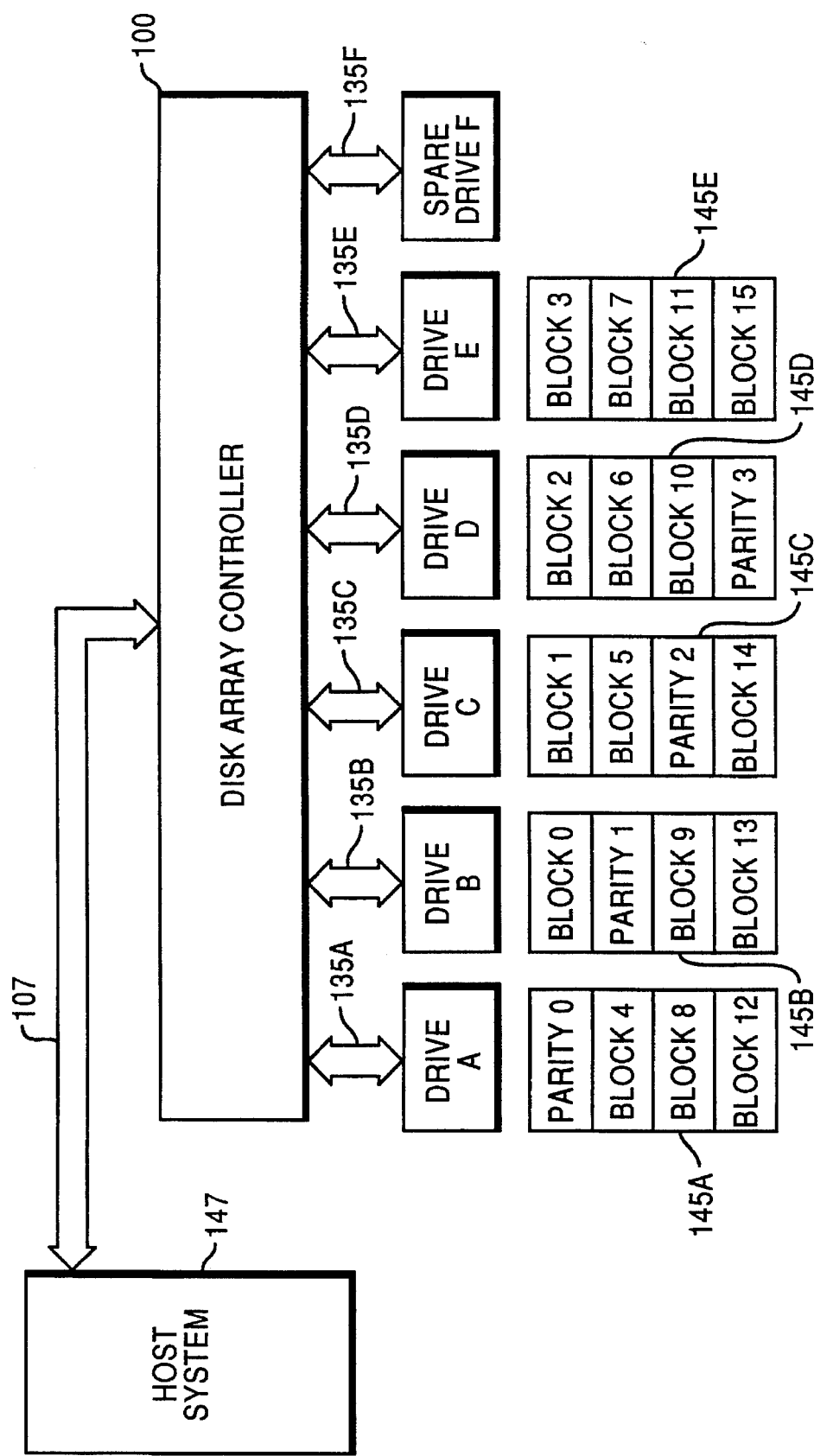
FIG. 2 is a block diagram representation of a RAID level 5 array including five disk drives.
Figure 8:
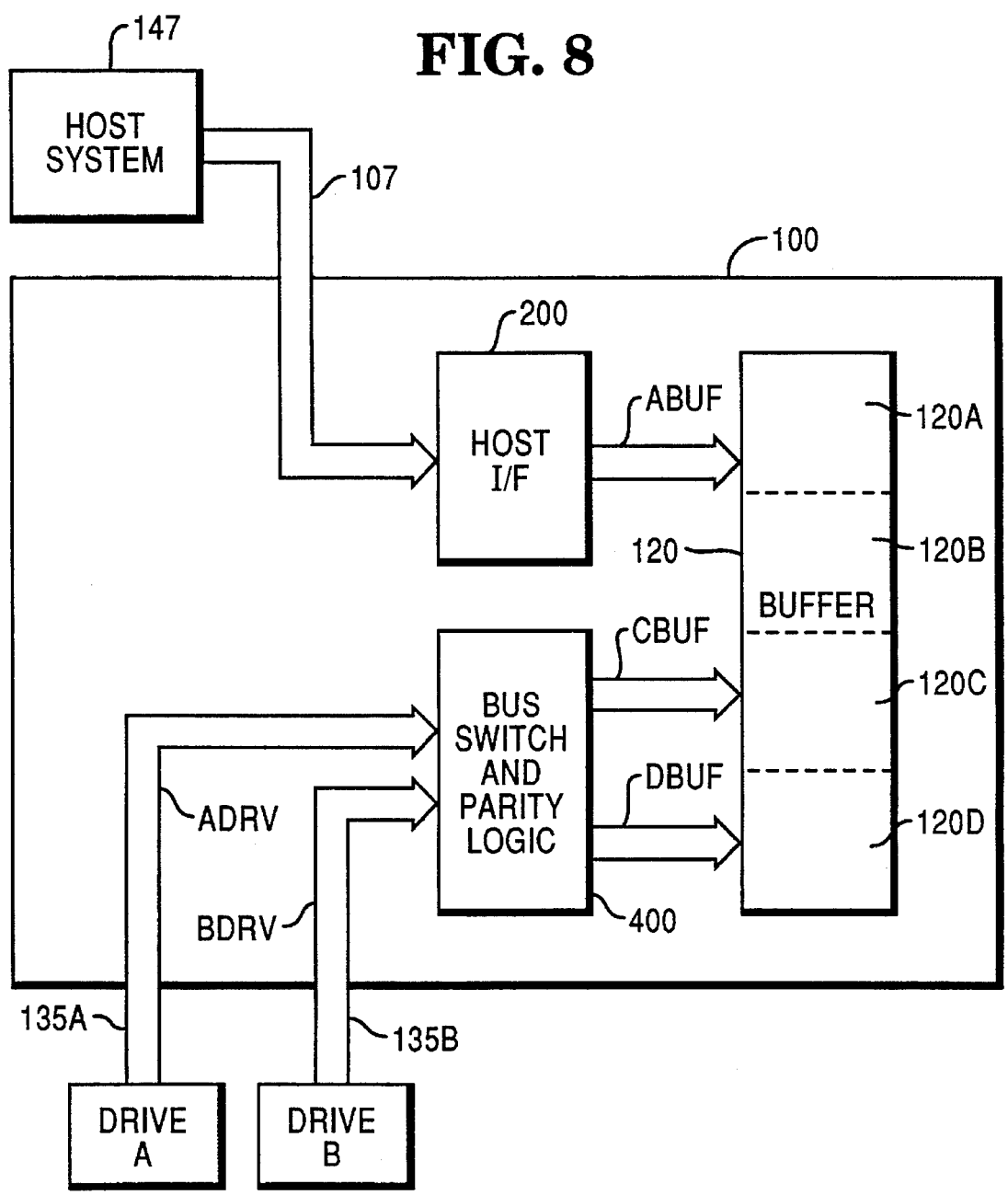
FIGS. 8 through 10 illustrate the use of the spare disk drive within the RAID level 5 disk array shown in FIG. 2 to capture original data images during array backup procedures in accordance with the method of the present invention.
Figure 9:
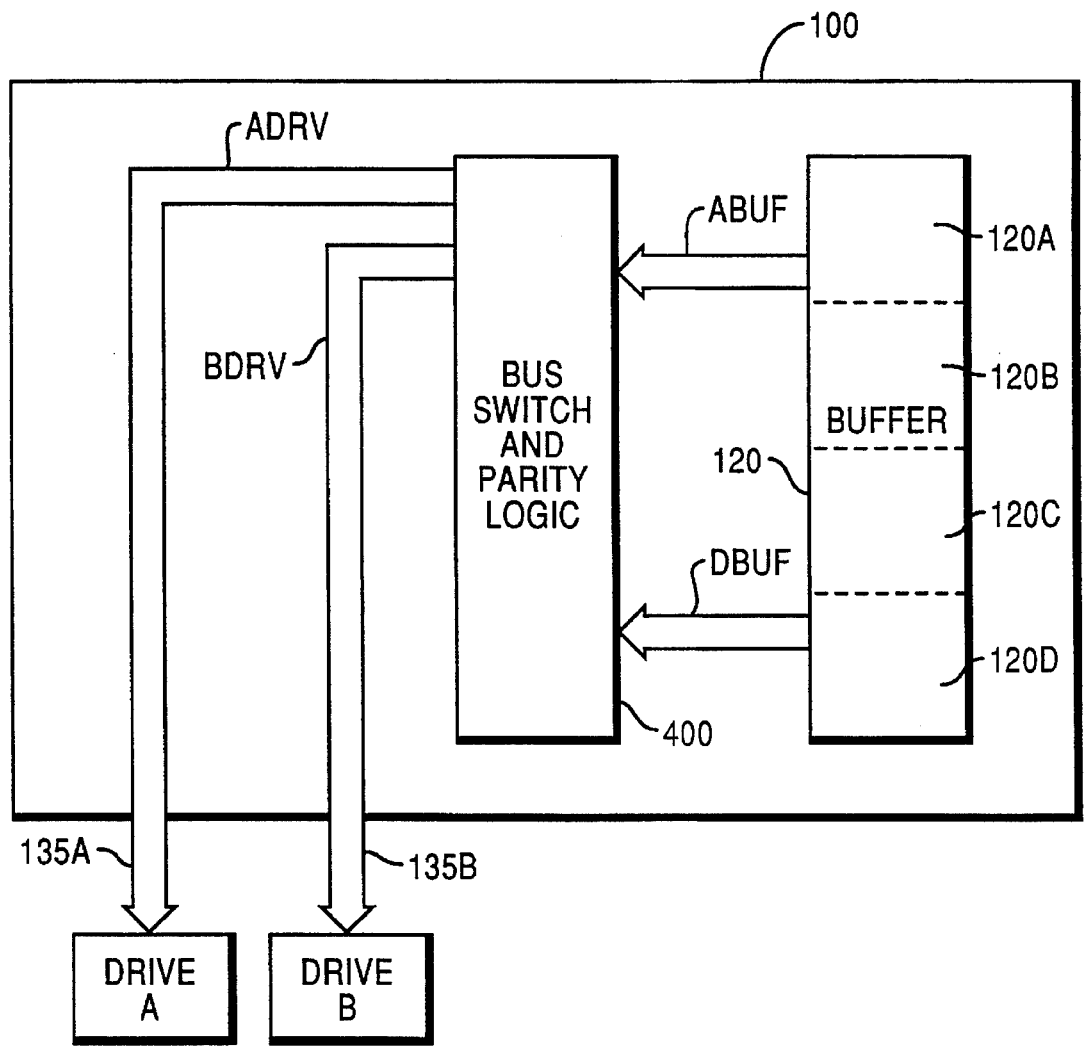
Figure 10:
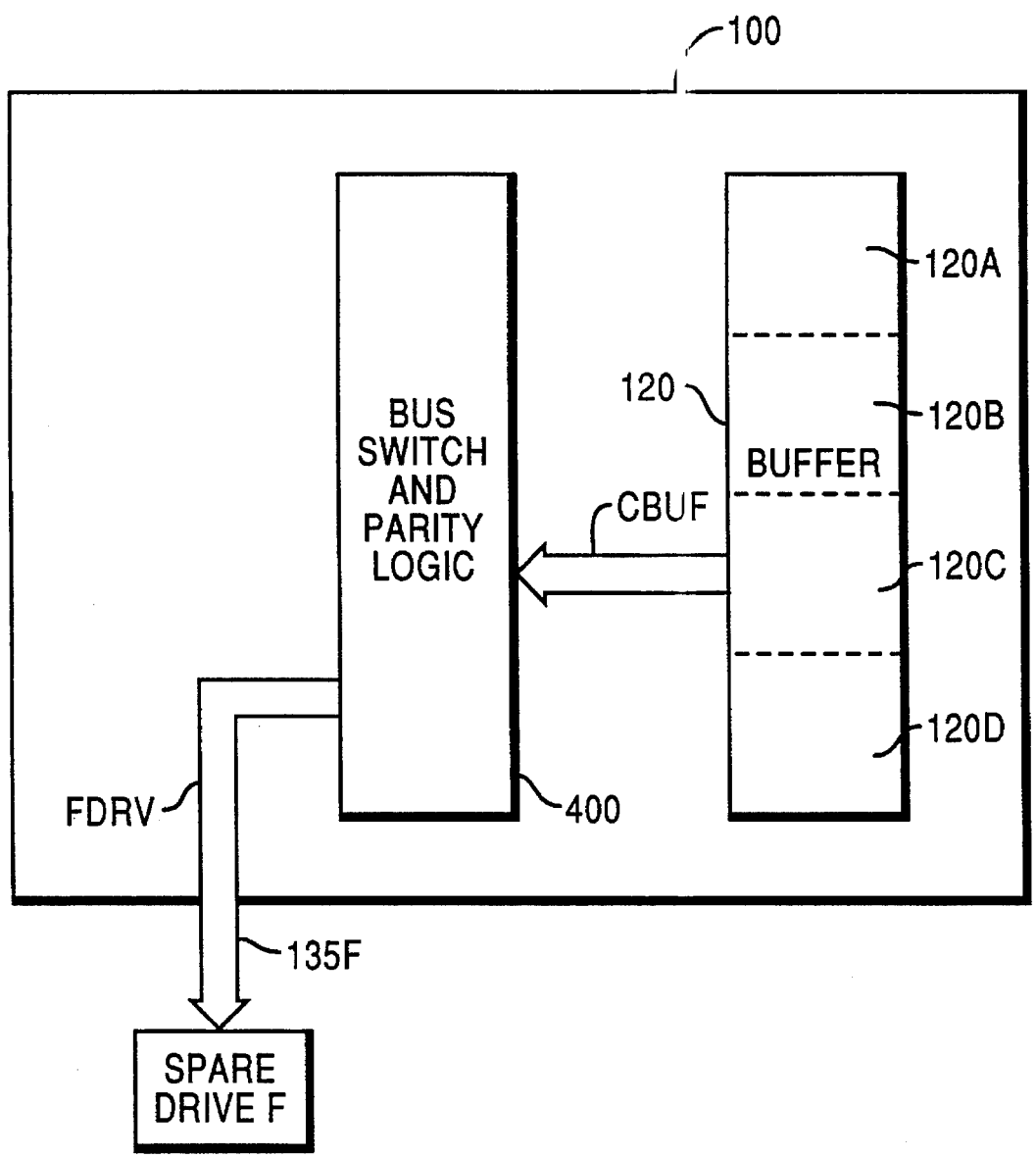

FIGS. 8 through 10 illustrate the use of the spare disk drive within the RAID level 5 disk array shown in FIG. 2 to capture original data images during array backup procedures in accordance with the method of the present invention. Within a RAID level 5 disk array, the original data image capture is managed as part of the read-modify-write process.

FIGS. 8 and 9 illustrate a RAID level 5 write involving DRIVE A and DRIVE B, wherein new data is to be written to DRIVE B and parity information is to be updated on DRIVE A. Under direction of the controller processor, not shown, old data and parity information blocks are first read from the two drives as shown in FIG. 8. The old data and parity are read from the target blocks within drives DRIVE B and DRIVE A, respectively, and routed via buses 135B and 135A to bus switch 400. Bus switch 400 is configured to combine the received data and parity to generate the exclusive-OR product: old data XOR old parity. This product is stored in a first area 120D within buffer 120. The new data received from host system 147 is directed by host I/F logic 200 into a second storage area 120A within buffer 120. The RAID level 5 disk array write process thus far described is part of the normal read-modify-write algorithm. However, bus switch 400 is further configured to save the old data read from DRIVE B to a second storage area 120C within buffer 120.

Completion of the array write operation, wherein the new data and parity information is written to DRIVE B and DRIVE A, respectively, is shown in FIG. 9. Bus switch 400 is reconfigured to route the new data read from area 120A in storage buffer 120 to DRIVE B. Bus switch 400 is further configured to generate new parity information by combining the new data with the previously saved product, old data XOR old parity, stored in storage buffer area 120D. The result, old data XOR old parity XOR new data, is written to DRIVE A.

The completion of the write of original data images to spare drive DRIVE F is shown in FIG. 10. Bus switch 400 is configured to write the old data saved to storage area 120C within buffer 120 to the spare drive DRIVE F.

As described above for RAID level 5 disk array systems, original data images are saved to storage buffer 120 prior to being written to spare drive DRIVE F. Thus, original data images obtained from several array write operations can be collected prior to scheduling a write I/O to DRIVE F, thereby conserving array controller processing time and improving the performance and efficiency of the concurrent image backup operation. Although not described above, buffer 120 is also utilized to stage original data images during concurrent image backup operations within a RAID level 3 disk array system, i.e., the original data images associated with write I/O requests within a RAID level 3 disk array are also first collected in buffer 120 prior to scheduling a write I/O to DRIVE F.

Upon conclusion of the backup process, the original data images captured to spare drive DRIVE F are transferred to the backup media, appended to the backed up data. A header or identifier is provided to the backup device to distinguish the captured original data images from the normal backed up data.

Should spare drive DRIVE F completely fill prior to completion of the backup process, the backup process will be interrupted and the contents of the spare drive purged to the backup device. The data written from the spare drive to the backup device is separated from backed up data blocks by a header and trailing delimiter. Backup is thereafter resumed. When the backup process has been completed, any additional data images captured to the spare drive DRIVE F are transferred to the backup media, appended to the backed up data, as described above.

Restoration of data following a loss of array data is achieved by first restoring the backed up data blocks and then applying the original images of the modified blocks to the restored data. If the spare drive was large enough to contain all of the captured original data images during backup, then the restoration process will require only one pass of the backup media. However, if purges were necessary to clear the contents of the spared drive to accomodate additional captured data images, two or more passes of the backup media may be required to apply the original images of the modified blocks to the restored data.

It can thus be seen that there has been provided by the present invention a new and useful method for providing computer system disk storage backup concurrent with normal, on-line, operation of the disk storage device. For disk arrays including spare disk drives, the present invention provides a new and useful method for utilizing the spare disk drive to stage and sequence data for a backup device. Write I/O requests are executed concurrent with backup procedures. Write I/O and backup processes are coordinated so that original images of data blocks to be updated are copied to the spare drive prior to their being written over if they have not yet been transferred to the backup device.

Those skilled in the art will recognize that the invention is not limited to the specific embodiments described above and that numerous modifications and changes are possible without departing from the scope of the present invention. For example, the method of the present invention is not limited to the array configurations shown. The present invention can also be utilized within any disk storage system, including disk arrays configured in accordance with RAID levels 1, 2, 3, 4 or 5. Disk arrays including more than five active drives, arrays including multiple ranks of drives, and logical disk arrays may also be accomodated by the present invention.

The invention as described utilizes an array spare drive as an intermediate staging area for original data images. Alternatively, controller RAM or other disk domain may be employed as the intermediate staging area. The method can also be modified to stage new data images being written to disk block locations which have already been transferred to the backup device to the spare drive. However, the backup process would then store the array state that exists upon the conclusion of the backup process rather than at the initiation of the backup process. Accordingly, the time of backup cannot be known prior to completion of the backup process.

Although the presently preferred embodiment of the invention has been described, it will be understood that various changes may be made within the scope of the appended claims.

What is claimed is:

1. In a disk storage system, a method for concurrently backing up contents of said disk storage system to a backup storage device and processing a write I/O request received by said disk storage system, comprising the steps of:

sequentially copying data from said disk storage system to said backup storage device;

halting said process of sequentially copying data from said disk storage system to said backup storage device upon receipt of said write I/O request;

determining whether said write I/O request updates data residing in a storage area within said disk storage system which has not been copied to said backup device;

copying the data residing in said storage area to a temporary storage device if the data residing in said storage area has not been copied to said backup device;

executing said write I/O request to update the data residing in said storage area;

resuming said process of sequentially copying data from said disk storage system to said backup storage device; and copying the contents of said temporary storage device to said backup storage device upon completion of said process of sequentially copying data from said disk storage system to said backup storage device.

2. The method according to claim 1, wherein said disk storage system is a disk array.

3. The method according to claim 2, wherein said temporary storage device is a spare drive within said disk array.

4. The method according to claim 3, wherein:

said disk array is a RAID level 3 disk array wherein data is multiplexed across a plurality of array drives;

said storage area comprises corresponding areas within each one of said plurality of array drives; and said step of copying the data residing in said storage area to a temporary storage device includes the step of reading data from said corresponding areas and writing said data to said spare drive.

5. The method according to claim 3, wherein said disk array is a RAID level 5 disk array employing a read-modify-write process for updating data and parity information stored upon first and second disk drives, respectively, in response to said write I/O request; and said step of copying the data residing in said storage area to a temporary storage device comprises the step of saving old data read from said first disk in accordance with said read-modify-write process to said spare drive.

6. In a disk array including a plurality of active disk drives and a spare disk drive, a method for backing up data from said array to a backup storage device, comprising the steps of:

sequentially copying data from said disk array to said backup storage device;

halting said process of sequentially copying data from said disk array to said backup storage device upon receipt of a write I/O request;

determining whether said write I/O request updates data residing in a storage area within said disk array which has not been copied to said backup device;

copying the data residing in said storage area to said spare drive if the data residing in said storage area has not been copied to said backup device;

executing said write I/O request to update the data residing in said storage area;

resuming said process of sequentially copying data from said disk array to said backup storage device; and copying the contents of said spare drive to said backup storage device upon completion of said process of sequentially copying data from said disk storage system to said backup storage device.

7. In a disk storage system, a method for processing write I/O requests received by the disk storage system and backing up data from said disk storage system to a backup storage device, comprising the steps of:

executing said write I/O requests directed to areas within said disk storage system which have been backed up to said backup storage device; and for write I/O requests directed to areas within said disk storage system which have not been backed up to said backup storage device, copying the data contents of said areas which have not been backed up to a temporary storage device and upon conclusion of backup procedures, transferring the data copied to said temporary storage device to said backup device.

8. A method for processing write I/O requests in a disk storage system, comprising the steps of:

receiving a write I/O request;

determining whether the write I/O request is directed to an area within said disk storage system which has been backed up to a backup storage device;

if the write I/O request is directed to said area within said disk storage system which has been backed up, executing the write I/O request; and if the write I/O request is directed to an area within said disk storage system which has not been backed up, copying data contents of said area which has not been backed up to a temporary storage device.

9. A system for selectively executing a write I/O request in a disk storage system, comprising:

means for determining whether the write I/O request is directed to an area within said disk storage system which has been backed up to a backup storage device;

means for executing the write I/O request if the write I/O request is directed to said area within said disk storage system which has been backed up; and means for copying data contents of an area which has not been backed up to a temporary storage device if the write I/O request is directed to said area which has not been backed up.

* * * * *